US005644022A

United States Patent [19]

Jensen

[11] Patent Number: 5,644,022
[45] Date of Patent: *Jul. 1, 1997

[54] COPOLYIMIDES PREPARED FROM 3,4'-OXYDIANILINE AND 1,3-BIS(3-AMINOPHENOXY) BENZENE WITH 3,3'-4,4'-BIPHENYLCARBOXYLIC DIANHYDRIDE HAVING REACTIVE ENDGROUPS

[75] Inventor: Brian J. Jensen, Williamsburg, Va.

[73] Assignee: The United States of America as represented by the Admninistrator of the National Aeronautics and Space Administration, Washington, D.C.

[*] Notice: The portion of the term of this patent subsequent to Feb. 14, 2015, has been disclaimed.

[21] Appl. No.: 388,090

[22] Filed: Feb. 14, 1995

[51] Int. Cl.$^6$ .......................... C08G 69/26; C08G 73/10
[52] U.S. Cl. .......................... 528/353; 528/125; 528/128; 528/170; 528/172; 528/173; 528/176; 528/183; 528/185; 528/188; 528/220; 528/229; 528/350; 428/411.1; 428/473.5; 524/600; 524/607; 526/935
[58] Field of Search .......................... 528/188, 353, 528/125, 128, 185, 183, 220, 229, 350, 170, 172, 173, 176; 428/473.5, 411.1; 526/935; 524/607, 600

[56] References Cited

U.S. PATENT DOCUMENTS

| 4,595,548 | 6/1986 | St. Clair et al. | 528/188 |
| 4,603,061 | 7/1986 | St. Clair et al. | 428/473.5 |
| 4,837,300 | 6/1989 | St. Clair et al. | 528/353 |
| 4,895,972 | 1/1990 | Stoakley et al. | 528/353 |
| 5,147,966 | 9/1992 | St. Clair et al. | 528/188 |

OTHER PUBLICATIONS

Polymer Preprint vol. 35, No. 1, 3, 1994, pp. 539–554 Bryant et al.

*Primary Examiner*—James J. Seidleck
*Assistant Examiner*—P. Hampton-Hightower
*Attorney, Agent, or Firm*—George F. Helfrich

[57] ABSTRACT

Polyimide copolymers were prepared by reacting different ratios of 3,4'-oxydianiline (ODA) and 1,3-bis(3-aminophenoxy)benzene (APB) with 3,3',4,4'-biphenylcarboxylic dianhydride (BPDA), and terminating with an effective amount of a reactive endcapper. The reactive endcappers employed include 4-phenylethynyl phthalic anhydride (PEPA), 3-aminophenoxy-4'-phenylethynylbenzophenone (3-APEB), maleic anhydride (MA) and nadic anhydride (5-norbornene-2,3-dicarboxylic anhydride) (NA). Within a relatively narrow ratio of diamines, from ~50% ODA/50% APB to ~95% ODA/5% APB, the copolyimides prepared with BPDA and terminated with reactive endgroups have a unique combination of properties that make them very attractive for a number of applications. This unique combination of properties includes low pressure processing (200 psi and below), long term melt stability (several hours at 300° C. for the phenylethynyl terminated polymers), high toughness, improved solvent resistance, improved adhesive properties and improved composite mechanical properties.

14 Claims, 1 Drawing Sheet

5,644,022

COPOLYIMIDES PREPARED FROM 3,4'-OXYDIANILINE AND 1,3-BIS(3-AMINOPHENOXY) BENZENE WITH 3,3'-4,4'-BIPHENYLCARBOXYLIC DIANHYDRIDE HAVING REACTIVE ENDGROUPS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to high performance polymers. The present invention relates particularly to polyimide copolymers with reactive endgroups that are useful as adhesives, composite matrices, moldings, films and coatings.

2. Description of Related Art

Wholly aromatic polyimides are known for their exceptional thermal, thermo-oxidative and chemical resistance, but are generally difficult to process as structural adhesives or composite matrices. Several polyimides such as Kapton® (DuPont), PI-2080 (Dow Chemical, licensed to Lenzing), XU-218 (Ciba-Geigy), Ultem® (General Electric) and LaRC™-TPI (Mitsui Toatsu) are commercially available and used as fibers, films, moldings, adhesives or composite matrices.

Currently available equipment to process polyimides into useful parts are limited in their pressure and temperature capability, and certain applications require checkering of adhesives and composites with other structures such as foams or honeycombs. Because of the equipment limitations (especially autoclaves) and concuring requirements, it is extremely important to provide materials that are processable at 250 psi or below and 371° C. or below. Because of the foams and honeycombs that are being proposed for use in some applications, reductions in pressure below 250 psi are also very significant.

While improved processing conditions are very important, the polyimides must also display better mechanical and adhesive properties to meet the needs of many future applications. Especially important for these applications are properties measured at temperatures of 177° C. or slightly higher for use over long time periods at those elevated temperatures.

Thermoplastic polymers currently available are either difficult to process into high quality parts or have limited mechanical performance at the elevated temperatures for short or long periods of time. The related art that comes closest to meeting the needs of future applications is a thermoplastic polyimide known as LARC™-IA, as described by St. Clair and Progar in U.S. Pat. No. 5,147,966. However, this polyimide requires higher processing conditions than desired and/or provides lower mechanical and adhesive properties than desired, depending on the tests performed.

The incorporation of ethynyl groups in polyimides has been reported in the literature, typically as terminal groups to yield acetylene-terminated imide oligomers (ATI). Therimid-600, an oligoimide with acetylene end groups was first developed at the Hughes Aircraft Co. [N. Bilow, A. L. Landis and L. J. Miller, U.S. Pat. No. 3,845,018 (1974); A. L. Landis, N. Bilow, R. H. Boschan, R. E. Lawrence and T. J. Aponyi, Polym. Prepr., 15, 537(1974); N. Bilow and A. L. Landis, Natl. SAMPE Tech. Conf. Ser., 8, 94(1976)]. Several reviews on polyimides or acetylene-terminated prepolymers are published and discuss other acetylene containing polyimides [P. M. Hergenrother, in (H. Mark, ed.) Encyclopedia of Polymer Science and Engineering, 2nd. ed., vol. 1, John Wiley and Sons, Inc., New York, 61(1985); P. M. Hergenrother in (H. Mark, ed.) Encyclopedia of Polymer Science and Engineering, 2nd. ed., vol. 7, John Wiley and Sons, Inc., New York, 639(1987); T. Takekoshi, in (C. G. Overberger, ed.) Advances in Polymer Science, 2(1990)]. Polyimides containing pendent ethynyl groups have been reported but one reference contains an abstract only with no experimental details or polymer properties [F. W. Harris, S. M. Padaki and S. Varaprath, Polym. Prep., 21(1 ), 3(1980)]. Another disclosure on polyimides containing pendent ethynyl groups contains detailed experimental information and polymer properties [B. J. Jensen, P. M. Hergenrother and G. Nwokogu, Polym, Prep., 33(1), 914 (1992) and B. J. Jensen, P. M. Hergenrother and G. Nwokogu, Polymer, 34(3), 630, (1993)].

Maleimide terminated polymers (bismaleimides) have been known for many years [G. F. D. Alelio, U.S. Pat. No. 3,929,713 (1975)]. They are a leading class of thermosetting polyimides because of their excellent processability and balance of thermal and mechanical properties, making them extremely popular in advanced composites and electronics. Many different bismaleimides have been synthesized with a variety of connecting groups between the maleimide rings [D. Wilson, H. D. Stenzenberger and P. M. Hergenrother, Polyimides, Blackie & Son Ltd., Bishopbriggs, Glasgow, United Kingdom, 1990].

Norbornene terminated polyimides have also been known for many years [H. R. Lubowitz, U.S. Pat. No. 3,528,950 (1970)]. The norbornene group reacts to form thermo-oxidatively stable polyimides which have found use as high temperature composite matrix resins [D. Wilson, H. D. Stenzenberger and P. M. Hergenrother, Polyimides, Blackie & Son Ltd., Bishopbriggs, Glasgow, United Kingdom, 1990].

A primary object of this invention is to provide polyimides terminated with reactive groups which can be processed at low pressures to provide polyimides with improved solvent resistance, modulus and elevated use temperatures.

Another object of this invention is to provide a polyimide copolymer system that can be processed without the evolution of volatiles, which is melt stable at high temperatures, which has improved adhesive properties, which has improved composite mechanical properties, and which has improved solvent resistance.

SUMMARY OF INVENTION

According to the present invention, polyimide copolymers were prepared by reacting different ratios of 3,4'-oxydianiline (ODA) and 1,3-bis(3-aminophenoxy)benzene (APB) with 3,3', 4,4'-biphenylcarboxylic dianhydride (BPDA), and terminating with the appropriate amount of a reactive endcapper. The reactive endcappers employed include but should not be limited to 4-phenylethynyl phthalic anhydride (PEPA), 3-aminophenoxy-4'-phenylethynylbenzophenone (3-APEB), maleic anhydride (MA) and nadic anhydride (5-norbornene-2,3-dicarboxylic anhydride, NA). Within a relatively narrow ratio of diamines, from ˜50% ODA/50% APB to [18] 95% ODA/5% APB, the copolyimides prepared with BPDA and terminated with reactive endgroups have a unique combination of properties that make them very attractive for a number of applications. This unique combination of properties includes low pressure processing (200 psi and below), long term melt stability (several hours at 300° C. for the phenylethynyl terminated polymers), high toughness, improved solvent resistance, improved adhesive properties and improved composite mechanical properties. The general synthetic procedure for a copolymer with 85% ODA and 15% APB at a theoretical molecular weight of ~5000 g/mole (~9% stoichiometric offset) terminated with PEPA is shown in the single drawing figure. Polymers are designated by LaRC™ for NASA Langley Research Center followed by a number which relates to the ratio of ODA to APB, followed by the endcapper abbreviation; i.e., LaRC™-8515 PEPA for the example above. Data for theoretical number average molecular weights ($M_n$), inherent viscosities ($\eta_{inh}$) and glass transition and melting temperatures are included in Table 1. Qualitative measurements of polymer processability and molding and/or molding flash toughness are included in Table 2. Thin film properties are included in Table 3. Fracture toughness and fracture energy are included in Table 4. Data for the titanium to titanium adhesive properties are included in Tables 5–8. Data for composite properties are included in Table 9. Data for polymer melt viscosities are included in Table 10. These copolyimides are eminently suitable as adhesives, composite matrices, moldings, films and coatings.

TABLE 1

Properties of Copolymers.

| Copolymer Terminated with Reactive Groups | Theoretical Molecular Weight, Mn | Inherent Viscosity[1], ηinh, dL/g | Glass Transition Temperature[2], Tg (Tm)(°C.) |
|---|---|---|---|
| LaRC ™-90/10 3-APEB | 5000 | 0.31 | 252 |
| LaRC ™-89/15 3-APEB | 5000 | 0.31 | 251 |
| LaRC ™-80/20 3-APEB | 5000 | 0.30 | 243 |
| LaRC ™-70/30 3-APEB | 5000 | 0.28 | 236 |
| LaRC ™-60/40 3-APEB | 5000 | 0.30 | 231 |
| LaRC ™-50/50 3-APEB | 5000 | 0.28 | 229 |
| LaRC ™-95/5 PEPA | 5000 | 0.33 | 280(378) |
| LaRC ™-85/15 PEPA | 2500 | 0.22 | 254 |
| LaRC ™-85/15 PEPA | 5000 | 0.29 | 263 |
| LaRC ™-85/15 PEPA | 10000 | 0.44 | 266 |
| LaRC ™-70/30 PEPA | 5000 | 0.29 | 252 |
| LaRC ™-85/15 NA | 9200 | 0.40 | 262 |
| LaRC ™-85/15 MA | 9200 | 0.42 | 264 |

[1]NMP at 25° C.
[2]DSC at a heating rate of 20° C./min.

TABLE 2

Processability of Copolymers.[1]

| Copolymer Terminated with Reactive Groups | Theoretical Molecular Weight, Mn | Pressure (psi) | Processability/ Quality |
|---|---|---|---|
| LaRC ™-90/10 3-APEB | 5000 | 200 | good/tough |
| LaRC ™-85/15 3-APEB | 5000 | 150 | excellent/tough |
| LaRC ™-80/20 3-APEB | 5000 | 150 | excellent/tough |
| LaRC ™-70/30 3-APEB | 5000 | 150 | excellent/tough |
| LaRC ™-60/40 3-APEB | 5000 | 150 | excellent/tough |
| LaRC ™-50/50 3-APEB | 5000 | 150 | excellent/tough |
| LaRC ™-95/5 PEPA | 5000 | 200 | poor/brittle |
| LaRC ™-85/15 PEPA | 2500 | 50 | excellent/tough |
| LaRC ™-85/15 PEPA | 5000 | 150 | excellent/tough |
| LaRC ™-85/15 PEPA | 10000 | 250 | poor/tough |
| LaRC ™-70/30 PEPA | 5000 | 150 | excellent/tough |
| LaRC ™-85/15 NA | 9200 | 200 | good/tough |
| LaRC ™-85/15 MA | 9200 | 200 | good/tough |

[1]See Example 14.

TABLE 3

Thin Film Properties of Copolymers.

| Copolymer Terminated with Reactive Groups | Test Temperature, °C. | Tensile Strength, Ksi | Tensile Modulus, Ksi | Elongation, % |
|---|---|---|---|---|
| LaRC ™-85/15 3-APEB (5000)[1] | 25 | 16.8 | 470 | 5.3 |
|  | 177 | 11.0 | 385 | 7.5 |
| LaRC ™-85/15 PEPA | 25 | 18.8 | 455 | 32 |

TABLE 3-continued

Thin Film Properties of Copolymers.

| Copolymer Terminated with Reactive Groups | Test Temperature, °C. | Tensile Strength, Ksi | Tensile Modulus, Ksi | Elongation, % |
|---|---|---|---|---|
| (5000)[1] | 177 | 12.2 | 332 | 83 |
| LaRC ™-85/15 PEPA | 25 | 18.6 | 492 | 15 |
| (10000)[1] | 177 | 10.2 | 301 | 61 |

[1]Theoretical Number Average molecular weight in g/mole.

TABLE 4

Fracture Toughness and Energy.

| Copolymer Terminated with Reactive Groups | Fracture toughness, psi × in$^{1/2}$ | Fracture energy, in-lbs/in$^2$ |
|---|---|---|
| LaRC ™-85/15 3-APEB (5000)[1] | 3400 | 25 |
| LaRC ™-85/15 PEPA (5000)[1] | 3550 | 28 |
| LaRC ™-85/15 PEPA (10000)[1] | 3900 | 31 |

[1]Theoretical Number Average Molecular weight in g/mole.

TABLE 5

Adhesive Properties[1] of LaRC ™-85/15 3-APEB Bonded 1 h at 350° C. under 100 psi.

| Test Temp, °C. | Exposure, hours at 177° C. | Tensile Shear Strength, psi |
|---|---|---|
| RT | none | 6100 |
| 177° C. | none | 4500 |
| 204° C. | none | 3770 |
| 177° C. | 1000 | 4675 |
| 177° C. | 3000 | 4270 |
| 177° C. | 5000 | 4320 |
| 177° C. | 10000 | 4370 |

[1]See Example 16.

TABLE 6

Adhesive Properties[1] of LaRC ™-85/15 PEPA (5000 g/mole) Bonded 1 h at 350° C. under 75 psi.

| Test Temp, °C. | Exposure | Tensile Shear Strength, psi |
|---|---|---|
| RT | none | 7630 |
| 177° C. | none | 5000 |
| 204° C. | none | 3770 |
| 177° C. | 1000 hours @ 177° C. | 4340 |
| 177° C. | 5000 hours @ 177° C. | 4330 |
| RT | 48 hour in MEK | 5470 |
| RT | 48 hour in Jet Fuel | 6975 |
| RT | 48 hour in Hydraulic Fluid | 4700 |
| RT | 48 hour Water Boil | 4590 |

[1]See Example 16.

TABLE 7

Adhesive Properties[1] of LaRC ™-85/15 PEPA of Different Molecular Weights at Various Cure Conditions Bonded at 75 psi.

2500 g/mole

| Cure Condition | Tensile Shear Strength, psi | |
|---|---|---|
|  | RT | 177° C. |
| 1 hr @ 350 | 5470 | 4520 |
| 1 hr @ 375 | 5760 | 4330 |
| ½ hr @ 325, then ½ hr @ 375 | 6490 | 4720 |
| 2 hr @ 316 | 6460 | 5100 |

5000 g/mole

| Cure Condition | Tensile Shear Strength, psi | |
|---|---|---|
|  | RT | 177° C. |
| 1 hr @ 350 | 7630 | 5000 |
| 1 hr @ 375 | 5290 | 3840 |
| ½ hr @ 325, then ½ hr @ 375 | 6370 | 3710 |
| 2 hr @ 316 | 5130 | 4970 |

10000 g/mole

| Cure Condition | Tensile Shear Strength, psi | |
|---|---|---|
|  | RT | 177° C. |
| 1 hr @ 350 | 4260 | 2840 |
| 1 hr @ 375 | N/A | 3160 |
| ½ hr @ 325, then ½ hr @ 375 | 4260 | 3050 |
| 2 hr @ 316 | 4250 | 3830 |

[1]See Example 16.

TABLE 8

Effects of Processing Pressure on Adhesive Properties[1] of LaRC ™-85/15 PEPA Bonded at 350° C. for 1 Hour.

| Theoretical Molecular Weight, g/mole | Processing Pressure, psi | Tensile Shear Strength, psi |
|---|---|---|
| 2500 | 75 | 5470 |
|  | 25 | 6030 |
| 10000 | 75 | 4260 |
|  | 100 | 6350 |
|  | 200 | 6380 |

[1]See Example 16.

TABLE 9

Composite Properties of Copolymers terminated With Reactive Groups.[1]

| Copolymer Terminated with Reactive Groups | Test Temp., °C. | Short Beam Shear, Strength,[2] Ksi | Flex Strength,[2] Ksi | Flex Modulus,[2] Msi | Open Hole Compression Strength,[3] Ksi |
|---|---|---|---|---|---|
| LaRC ™-85/15 3-APEB | 25 | 16.4 | 268 | 23 | |
|  | 177 | 10.2 | 190 | 22 | |
| LaRC ™-85/15 PEPA | 25 | 15.5 | 259 | 21 | 62 |
|  | 93 | 14.2 | 264 | 22 | |
|  | 150 | 11.7 | 225 | 21 | |
|  | 177 | 9.1 | 209 | 19 | 46 |

[1] Composites processed at 250 psi and 371° C.
[2] Unidirectional specimen layup.
[3] Specimen layup:[±45/90/0/0/±45/0/0/±45/0]$_s$.

TABLE 10

Melt Viscosity[1] of LaRC ™-85/15 PEPA at Various Temperatures.

| Temperature, °C. | Melt Viscosity, Poise |
|---|---|
| 300 | $1.2 \times 10^6$ |
| 320 | $9.7 \times 10^5$ |
| 340 | $4.5 \times 10^5$ |
| 360 | $3.4 \times 10^4$ |
| 371 | $8.3 \times 10^3$ |
| 371, after 10 min | $1.2 \times 10^5$ |
| 371, after 20 min | $3.0 \times 10^5$ |

[1] See Example 19.

A primary advantage of these copolyimides terminated with reactive groups, as compared to other polyimides terminated with reactive groups, is the unique combination of high mechanical properties and easy processing into useful parts. These copolyimides have excellent solvent resistance, high glass transition temperature and high modulus but are processable under low pressures. This combination of properties is unique and is unexpected for these polyimides. The dianhydride used here contains a very rigid biphenyl structure which typically provides polyimides with poor processability. The addition of the highly flexible APB diamine provides the improved processability while the biphenyl structure provides backbone stiffness, improved solvent resistance and improved mechanical properties. These properties are important for applications as films, coatings, moldings, adhesives and composites. If too little APB is incorporated into the polymer backbone, the resulting material becomes semi-crystalline and highly rigid, providing a material that is not processable under desired processing limitations. If too much APB is incorporated into the polymer backbone, the resulting material becomes highly flexible with a low glass transition temperature, providing a material that has poor mechanical properties at elevated temperatures (>150° C.) and decreased solvent resistance. Therefore, by simply changing the ratio of ODA to APB, a material with a unique combination of solubility, Tg, Tm, melt viscosity, toughness and elevated temperature mechanical properties is prepared.

BRIEF DESCRIPTION OF THE DRAWINGS

The sole drawing FIGURE is an equation setting forth the general synthetic procedure for providing a polyimide copolymer according to the present invention having 85% ODA and 15% APB, which is terminated with PEPA.

DESCRIPTION OF THE PREFERRED EMBODIMENTS

Figure 1:
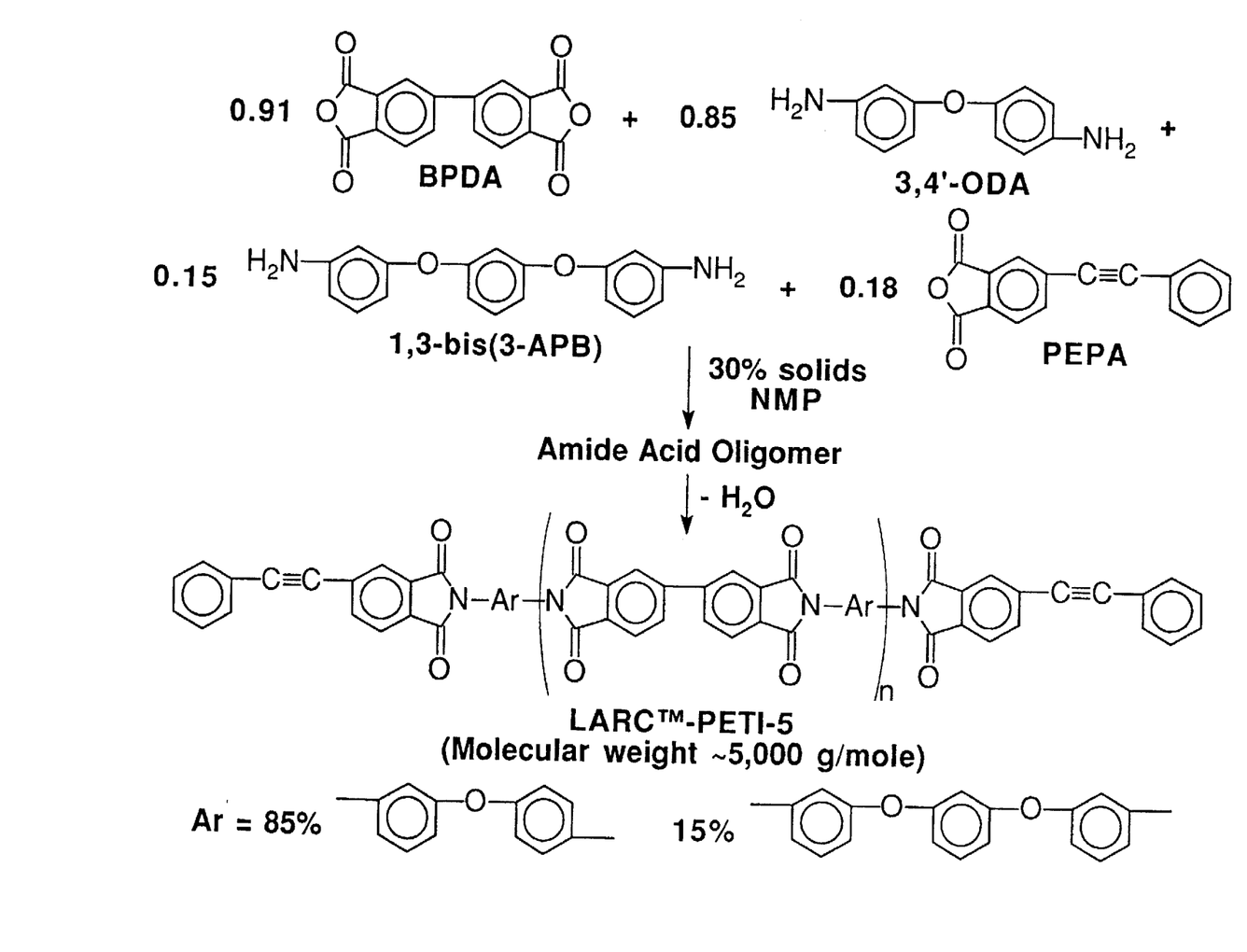

Imide oligomers terminated with reactive groups with a wide range of molecular weights (~1500 to ~15,000 g/mole) are readily prepared by offsetting the ratio of one monomer relative to the other by a calculated amount and adding an appropriate amount of endcapper containing the reactive group. The low molecular weight versions of these materials have better processability than the high molecular weight versions, however, the high molecular weight versions have better film forming capabilities than the low molecular weight versions. Copolymers with higher amounts of APB have better processability but lower Tgs, while copolymers with higher amounts of ODA have higher Tgs but poorer processability. Furthermore, copolymers with higher amounts of APB remain soluble after solution imidizing at 160° C. with toluene used to remove water, while copolymers with higher amounts of ODA become insoluble after solution imidizing and precipitate from the reaction. Furthermore, imidized powders of copolymers with higher amounts of ODA are insoluble in NMP at 25° C. after drying at >100° C. However, unexpectedly (because of the rigid BPDA unit) the imidized powders of copolymers with higher amounts of APB are soluble in NMP at 25° C. after drying at >100° C. In addition, this particular imide backbone also has an advantageous effect on volatile removal. Some other polyimides terminated with reactive groups retained a much higher volatile content after a 1 hour at 225° C. hold than these copolyimides. The temperatures and pressures used to process these materials are limited by the equipment available, while the mechanical properties desired are based on current or future applications. The copolymers discussed herein have a unique combination of properties which allow them to be processed on currently available equipment at very low pressures but meet these desired mechanical properties. Therefore, copolymers according to the present invention can be provided with the proper combination of properties for the desired application by controlling the ratio of the amine monomers, the molecular weight and the type of reactive endgroup used. Since the different endgroups have different reaction onset temperatures and different cure chemistries, a variety of properties can be systematically controlled. Specific examples follow.

EXAMPLE 1

Synthesis of LaRC™-90/10 3-APEB

The following example illustrates the synthesis of a phenylethynyl-terminated imide cooligomer with theoretical number average molecular weight of 6000 g/mole. 3,4'-Oxydianiline (ODA) (24.974 mmole, 5.0010 g), 1,3-bis(3-aminophenoxy)benzene (APB) (2.7749 mmole, 0.8112 g), 3,3',4,4'-biphenyl tetracarboxylic dianhydride (BPDA) (30.00 mmole, 8.8267 g), 4-(3-aminophenoxy)-4'-phenylethynylbenzophenone (3-APEB) (4.5012 mmole, 1.7529 g), N-methylpyrrollidinone (NMP) (65 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.31 dL/g, NMP at 25° C.) followed by adding toluene (40 mL) and heating at 160° C. for 24 h. A yellow precipitate formed during the heating. After cooling, the yellow precipitate was poured into water, washed in boiling methanol and dried at 110° C. for 72 hours to afford a yellow solid in >95% yield. The resulting phenylethynyl-terminated polyimide powder was insoluble in NMP at 25° C. The final Tg by DSC was 252° C., measured after curing one hour at 350° C. A film cast from the polyamide acid solution and cured one hour at 350° C. was unaffected by MEK, toluene, jet fuel, and hydraulic fluid.

EXAMPLE 2

Synthesis of LaRC™-85/15 3-APEB

The following example illustrates the synthesis of a phenylethynyl-terminated imide cooligomer with theoretical number average molecular weight of 5000 g/mole. 3,4'-Oxydianiline (ODA) (23.199 mmole, 4.6456 g), 1,3-bis(3-aminophenoxy)benzene (APB) (4.094 mmole, 1.1968 g), 3,3',4,4'-biphenyl tetracarboxylic dianhydride (BPDA) (30.00 mmole, 8.8267 g), 4-(3-aminophenoxy)-4'-phenylethynylbenzophenone (3-APEB) (5.412 mmole, 2.1077 g), N-methylpyrrollidinone (NMP) (67 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.31 dL/g, NMP at 25° C.) followed by adding toluene (40 mL) and heating at 160° C. for 24 h. A yellow precipitate formed during the heating. After cooling, the yellow precipitate was poured into water, washed in boiling methanol and dried at 110° C. for 72 hours to afford a yellow solid in >95% yield. The resulting phenylethynyl-terminated polyimide powder was insoluble in NMP at 25° C. The final Tg by DSC was 251 ° C., measured after curing one hour at 350° C. A film cast from the polyamide acid solution and cured one hour at 350° C. was unaffected by MEK, toluene, jet fuel, and hydraulic fluid.

EXAMPLE 3

Synthesis of LaRC™-80/2.0 3-APEB

The following example illustrates the synthesis of a phenylethynyl-terminated imide cooligomer with theoretical number average molecular weight of 5000 g/mole. 3,4'-Oxydianiline (ODA) (21.816 mmole, 4.3686 g), 1,3-bis(3-aminophenoxy)benzene (APB) (5.454 mmole, 1.5944 g), 3,3', 4,4'-biphenyl tetracarboxylic dianhydride (BPDA) (30.00 mmole, 8.8267 g), 4-(3-aminophenoxy)-4'-phenylethynylbenzophenone (3-APEB) (5.46 mmole, 2.1264 g), N-methylpyrrollidinone (NMP) (68 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.30 dL/g, NMP at 25° C.) followed by adding toluene (40 mL) and heating at 160° C. for 24 h. A precipitate formed during the cool down. After cooling, the greenish-yellow semi-solid was poured into water, washed in boiling methanol and dried at 110° C. for 72 hours to afford a yellow solid in >95% yield. The resulting phenylethynyl-terminated polyimide powder was insoluble in NMP at 25° C. The final Tg by DSC was 243° C., measured after curing one hour at 350° C. A film cast from the polyamide acid solution and cured one hour at 350° C. was unaffected by MEK, toluene, jet fuel, and hydraulic fluid.

EXAMPLE 4

Synthesis of LaRC™-70/30 3-APEB

The following example illustrates the synthesis of a phenylethynyl-terminated imide cooligomer with theoretical number average molecular weight of 5000 g/mole. 3,4'-Oxydianiline (ODA) (19.053 mmole, 3.8153 g), 1,3-bis(3-aminophenoxy)benzene (APB) (8.1655 mmole, 2.3871 g), 3,3', 4,4'-biphenyl tetracarboxylic dianhydride (BPDA) (30.00 mmole, 8.8267 g), 4-(3-aminophenoxy)-4'-phenylethynylbenzophenone (3-APEB) (5.5632 mmole, 2.1666 g), N-methylpyrrollidinone (NMP) (69 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.28 dL/g, NMP at 25° C.) followed by adding toluene (40 mL) and heating at 160° C. for 24 h. After cooling, the still soluble polyimide was poured into water, washed in boiling methanol and dried at 110° C. for 72 hours to afford a yellow solid in >95% yield. The resulting phenylethynyl-terminated polyimide powder was soluble in NMP at 25° C. The final Tg by DSC was 236° C., measured after curing one hour at 350° C. A film cast from the polyamide acid solution and cured one hour at 350° C. was unaffected by MEK, toluene, jet fuel, and hydraulic fluid.

EXAMPLE 5

Synthesis of LaRC™-60/40 3-APEB

The following example illustrates the synthesis of a phenylethynyl-terminated imide cooligomer with theoretical number average molecular weight of 5000 g/mole. 3,4'-Oxydianiline (ODA) (16.301 mmole, 3.2642 g), 1,3-bis(3-aminophenoxy)benzene (APB) (10.867 mmole, 3.1769 g), 3,3', 4,4'-biphenyl tetracarboxylic dianhydride (BPDA) (30.00 mmole, 8.8267 g), 4-(3-aminophenoxy)-4'-phenylethynylbenzophenone (3-APEB) (5.665 mmole, 2.2062 g), N-methylpyrrollidinone (NMP) (67 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.30 dL/g, NMP at 25° C.) followed by adding toluene (40 mL) and heating at 160° C. for 24 h. After cooling, the still soluble polyimide was poured into water, washed in boiling methanol and dried at 110° C. for 72 hours to afford a yellow solid in >95% yield. The resulting phenylethynyl-terminated polyimide powder was soluble in NMP at 25° C. The final Tg by DSC was 231° C., measured after curing one hour at 350° C. A film cast from the polyamide acid solution and cured one hour at 350° C. was unaffected by MEK, toluene, jet fuel, and hydraulic fluid.

EXAMPLE 6

Synthesis of LaRC™-50/50 3-APEB

The following example illustrates the synthesis of a phenylethynyl-terminated imide cooligomer with theoretical number average molecular weight of 5000 g/mole. 3,4'-Oxydianiline (ODA) (13.559 mmole, 2.7152 g), 1,3-bis(3-aminophenoxy)benzene (APB) (13.559 mmole, 3.9638 g), 3,3',4,4'-biphenyl tetracarboxylic dianhydride (BPDA) (30.00 mmole, 8.8267 g), 4-(3-aminophenoxy)-4'-phenylethynylbenzophenone (3-APEB) (5.764 mmole, 2.2448 g), N-methylpyrollidinone (NMP) (67 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.28 dL/g, NMP at 25° C.) followed by adding toluene (40 mL) and heating at 160° C. for 24 h. After cooling, the still soluble polyimide was poured into water, washed in boiling methanol and dried at 110° C. for 72 hours to afford a yellow solid in >95% yield. The resulting phenylethynyl-terminated polyimide powder was soluble in NMP at 25° C. The final Tg by DSC was 229° C., measured after curing one hour at 350° C. A film cast from the polyamide acid solution and cured one hour at 350° C. was unaffected by MEK, toluene, jet fuel, and hydraulic fluid.

EXAMPLE 7

Synthesis of LaRC™-95/5 PEPA

The following example illustrates the synthesis of a phenylethynyl-terminated imide cooligomer with theoretical number average molecular weight of 5000 g/mole. 3,4'-Oxydianiline (ODA) (28.50 mmole, 5.7070 g), 1,3-bis(3-aminophenoxy)benzene (APB) (1.500 mmole, 0.4385 g), 3,3',4,4'-biphenyl tetracarboxylic dianhydride (BPDA) (27.345 mmole, 8.0456 g), 4-phenylethynyl phthalic anhydride (PEPA) (5.310 mmole, 1.3182 g), N-methylpyrollidinone (NMP) (62 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$=0.33 dL/g, NMP at 25° C.) followed by adding toluene (40 mL) and heating at 160° C. for 24 hours. A yellow precipitate formed during the heating. After cooling, the yellow precipitate was poured into water, washed in boiling methanol and dried at 110° C. for 72 hours to afford a yellow solid in >95% yield. The resulting phenylethynyl-terminated polyimide powder was insoluble in NMP at 25° C. After one hour at 350° C., the final Tg was 280° C. by DSC and a Tm peak of 378° C. was measured. A film cast from the polyamide acid solution and cured one hour at 350° C. was unaffected by MEK, toluene, jet fuel, and hydraulic fluid.

EXAMPLE 8

Synthesis of LaRC™-85/15 PEPA

The following example illustrates the synthesis of a phenylethynyl-terminated imide cooligomer with theoretical number average molecular weight of 5000 g/mole. 3,4'-Oxydianiline (ODA) (1.700 mole, 340.42 g), 1,3-bis(3-aminophenoxy)benzene (APB) (0.300 mole, 87.70 g), 3,3',4,4'-biphenyl tetracarboxylic dianhydride (BPDA) (1.8196 mole, 535.37 g), 4-phenylethynyl phthalic anhydride (PEPA) (0.3608 mole, 89.57 g), N-methylpyrollidinone (NMP) (1580 g) were added to a 3 L reaction kettle equipped with a mechanical stirrer, condenser and nitrogen inlet. The reaction was stirred at 25° C. for 16 hours to form the phenylethynyl-terminated polyamide acid ($\eta_{inh}$=0.29 dL/g, NMP at 25° C.) followed by adding toluene (40 mL) and heating at 160° C. for 24 hours. A yellow precipitate formed during the heating. After cooling, the yellow precipitate was poured into water, washed in boiling methanol and dried at 110° C. for 72 hours to afford a yellow solid in >95% yield. The resulting phenylethynyl-terminated polyimide powder was insoluble in NMP at 25° C. The final Tg of 263° C. was measured after one hour at 350° C. A film cast from the polyamide acid solution and cured one hour at 350° C. was unaffected by MEK, toluene, jet fuel, and hydraulic fluid.

EXAMPLE 9

Synthesis of LaRC™-70/30 PEPA

The following example illustrates the synthesis of a phenylethynyl-terminated imide cooligomer with theoretical number average molecular weight of 5000 g/mole. 3,4'-Oxydianiline (ODA) (21.00 mmole, 4.2052 g), 1,3-bis(3-aminophenoxy)benzene (APB) (9.00 mmole, 2.6310 g), 3,3',4,4'-biphenyl tetracarboxylic dianhydride (BPDA) (27, 220 mmole, 8.0085 g), 4-phenylethynyl phthalic anhydride (PEPA) (5.56 mmole, 1.3802 g), N-methylpyrollidinone (NMP) (65 g) were added to a 250 mL three neck flask equipped with a mechanical stirrer, condenser and nitrogen inlet. The reaction was stirred at 25° C. for 16 hours to form the phenylethynyl-terminated polyamide acid ($\eta_{inh}$)=0.29 dL/g, NMP at 25° C.) followed by adding toluene (40 mL) and heating at 160° C. for 24 h. After cooling, the still soluble polyimide was poured into water, washed in boiling methanol and dried at 110° C. for 72 hours to afford a yellow solid in >95% yield. The resulting phenylethynyl-terminated polyimide was soluble in NMP at 25° C. The final Tg of 252° C. was measured after one hour at 350° C. A film cast from the polyamide acid solution and cured one hour at 350° C. was unaffected by MEK, toluene, jet fuel, and hydraulic fluid.

EXAMPLE 10

Synthesis of LaRC™-85/15 PEPA

The following example illustrates the synthesis of a phenylethynyl-terminated imide cooligomer with theoretical number average molecular weight of 2500 g/mole. 3,4'-Oxydianiline (ODA) (0.2125 mole, 42.5523 g), 1,3-bis(3-aminophenoxy)benzene (APB) (0.0375 mole, 10.9625 g), 3,3', 4,4'-biphenyl tetracarboxylic dianhydride (BPDA) (0.2069 mole, 60.8749 g), 4-phenylethynyl phthalic anhydride (PEPA) (0.0862 mole, 21.3983 g), N-methylpyrollidinone (NMP) (252 g) were added to a 1 L three neck flask equipped with a mechanical stirrer, condenser and nitrogen inlet. The reaction was stirred at 25° C. for 16 hours to form the phenylethynyl-terminated polyamide acid ($\eta_{inh}$=0.22 dL/g, NMP at 25° C.) followed by adding toluene (100 mL) and heating at 160° C. for 24 hours. A yellow precipitate formed during the heating. After cooling, the reaction was poured into water, washed in boiling methanol and dried at 110° C. for 72 hours to afford a yellow solid in >95% yield. The resulting phenylethynyl-terminated polyimide powder was insoluble in NMP at 25° C. The final Tg of 254° C. was measured after one at 350° C. A film cast from the polyamide acid solution and cured one hour at 350° C. was unaffected by MEK, toluene, jet fuel, and hydraulic fluid.

EXAMPLE 11

Synthesis of LaRC™-85/15 PEPA

The following example illustrates the synthesis of a phenylethynyl-terminated imide cooligomer with theoretical number average molecular weight of 10,000 g/mole. 3,4'-Oxydianiline (ODA) (0.2125 mole, 42.5523 g), 1,3-bis(3-aminophenoxy)benzene (APB) (0.0375 mole, 10.9625 g), 3,3', 4,4'-biphenyl tetracarboxylic dianhydride (BPDA) (0.2385 mole, 70.1621 g), 4-phenylethynyl phthalic anhydride (PEPA) (0.02306 mole, 5.7245 g), N-methylpyrollidinone (NMP) (240 g) were added to a 1 L three neck flask equipped with a mechanical stirrer, condenser and nitrogen inlet. The reaction was stirred at 25° C. for 16 hours to form the phenylethynyl-terminated polyamide acid ($\eta_{inh}$=0.44 dL/g, NMP at 25° C.) followed by adding toluene (100 mL) and heating at 160° C. for 24 h. A yellow precipitate formed during the heating. After cooling, the yellow precipitate was poured into water, washed in boiling methanol and dried at 110° C. for 72 hours to afford a yellow solid in >95% yield. The resulting phenylethynyl-terminated polyimide powder was insoluble in NMP at 25° C. The final Tg of 266° C. was measured after one hour at 350° C. A film cast from the polyamide acid solution and cured one hour at 350° C. was unaffected by MEK, toluene, jet fuel, and hydraulic fluid.

EXAMPLE 12

Synthesis of LaRC™-85/15 NA

The following example illustrates the synthesis of a norbornene(nadimide)-terminated imide cooligomer with theoretical number average molecular weight of 9200 g/mole. 3,4'-Oxydianiline (ODA) (8.500 mmole, 1.7021 g), 1,3-bis(3-aminophenoxy)benzene (APB) (1.500 mmole, 0.4385 g), 3,3', 4,4'-biphenyl tetracarboxylic dianhydride (BPDA) (9.500 mmole, 2.7951 g), nadic anhydride (NA) (1.000 mmole, 0.1642 g), N-methylpyrollidinone (NMP) (20.4 g) were added to a 100 mL three neck flask equipped with a mechanical stirrer, condenser and nitrogen inlet. The reaction was stirred at 25° C. for 16 hours to form the norbornene(nadimide)-terminated polyamide acid ($\eta_{inh}$= 0.40 dL/g, NMP at 25° C.) followed by adding toluene (20 mL) and heating at 160° C. for 24 h. A yellow precipitate formed during the heating. After cooling, the yellow precipitate was poured into water, washed in boiling methanol and dried at 110° C. for 72 hours to afford a yellow solid in >95% yield. The resulting norbornene(nadimide)-terminated polyimide was insoluble in NMP. The final Tg of 262° C. was measured after one hour at 316° C. A film cast from the polyamide acid solution and cured one hour at 316° C. was unaffected by MEK, toluene, jet fuel, and hydraulic fluid.

EXAMPLE 13

Synthesis of LaRC™-85/15MA

The following example illustrates the synthesis of a maleimide-terminated imide cooligomer with theoretical number average molecular weight of 9200 g/mole. 3,4'-Oxydianiline (ODA) (8.500 mmole, 1.7021 g), 1,3-bis(3-aminophenoxy)benzene (APB) (1.500 mmole, 0.4385 g), 3,3', 4,4'-biphenyl tetracarboxylic dianhydride (BPDA) (9.500 mmole, 2.7951 g), maleic anhydride (MA) (1.000 mmole, 0.0981 g), N-methylpyrollidinone (NMP) (20.1 g) were added to a 100 mL three neck flask equipped with a mechanical stirrer, condenser and nitrogen inlet. The reaction was stirred at 25° C. for 16 hours to form the maleimide-terminated polyamide acid ($\eta_{inh}$=0.42 dL/g, NMP at 25° C.) followed by adding toluene (20 mL) and heating at 160° C. for 24 h. A yellow precipitate formed during the heating. After cooling, the yellow precipitate was poured into water, washed in boiling methanol and dried at 110° C. for 72 hours to afford a yellow solid in >95% yield. The resulting maleimide-terminated polyimide was insoluble in NMP. The final Tg of 264° C. was measured after one hour at 316° C. A film cast from the polyamide acid solution and cured one hour at 316° C. was unaffected by MEK, toluene, jet fuel, and hydraulic fluid.

EXAMPLE 14

Preparation of Moldings

The following process was used to test the compression molding of polymeric materials prepared according to the aforementioned examples. Dried powders of the polyimide copolymers (1 gram) were placed in a 1.25 inch square stainless steel mold which was placed in a preheated hydraulic press. For all phenylethynyl terminated copolymers, the molds were heated to 350° C. and pressure was applied. For maleic and nadic anhydride terminated copolymers, the molds were heated to 316° C. and pressure was applied. The pressure and temperature were held constant for 1 hour. The results are presented in Table 2. Poor processability means inadequate flow and an unconsolidated molding, good processability means a consolidated molding but little molding flash and excellent processability means a well consolidated molding with a lot of molding flash indicating lower pressures would probably provide good moldings. Quality indicates toughness of the molding and/or molding flash.

EXAMPLE 15

Preparation of Adhesive Tape

Solutions of several of the compositions in the Examples, i.e. 20–40% solids in NMP, were used to prepare adhesive tapes as follows. The solutions were applied to style 112, A1100 finish E-glass cloth which had been dried for 0.5 hours in a forced air oven. The coated cloths were air dried 1 hour each at 100°, 175° and 225° C. between application of subsequent coats. This procedure was continued until a nominal thickness of 0.012 inch was obtained. The area to be bonded was coated (primed) on each adherend with a dilute solution ($^{18}$5% solids) of the same composition as the adhesive tape and air dried 1 hour each at 100°, 175° and 225° C. prior to bonding with the adhesive tape.

EXAMPLE 16

Adhesive Bonding

The prepared adhesive tapes from Example 15 were cut into strips sufficient to cover the bond area so as to give a 0.5 inch overlap for surface-treated (Pasa Jell 107) titanium alloy (Ti-6Al-4V) four fingered panel adherends. Each tape was placed between the overlapped panels and the specimens were assembled in a bonding jig in such a manner as to hold the specimens securely while being bonded. The assembly was placed in a hydraulic press and 25 to 200 psi pressure was applied. The temperature, monitored by a thermocouple, was increased from room temperature to 371° C. during ¯45 minutes and held for 1 hour while pressure was maintained. The heat was turned off and the press was allowed to cool under pressure to <150° C. The bonded panel was removed from the press and jig and the individual specimens were separated with a metal shearer. The lap shear strengths were determined according to the procedure for ASTM-1002. Results are given in Tables 5–8.

EXAMPLE 17

Preparation of Graphite Fiber with Polymer Coating

Solutions of polymer from Examples 2 and 8 were coated onto continuous graphite fiber (Hercules, Inc., IM-7). After coating, the wet fiber was dried in ovens to remove most of the solvent and convert the poly(amide) acid to polyimide. The polymer-solids-to-graphite-fiber ratio was approximately one to two. This prepreg was held for composite fabrication.

EXAMPLE 18

Preparation of Graphite Fiber Reinforced Composite

The prepreg from Example 17 was cut into three inch square pieces and placed in a three inch by three inch matched-metal-die mold with the fiber all aligned in the same direction(unidirectional). Ten plies of the prepreg were stacked in this manner and the mold was placed in a heated hydraulic press. The mold was heated to 225° C. for 1 hour, then heated to 371 ° C. with 250 psi pressure applied after 5 minutes at 371 ° C. and held for 1 hour at 371 ° C. After cooling to ambient conditions, the pressure was released and a well consolidated composite part was removed from the mold. The resin content of the molded composite was calculated to be approximately 33 percent.

EXAMPLE 19

Measurement of Melt Viscosity and Melt Stability

The polyimide copolymers according to the present invention were subjected to melt rheology measurements using the Rheometrics System IV rheometer and a Brabender equipped with a Mixer Measuring Head. Both techniques indicate that these copolymers have low melt viscosities and good melt stabilities when heated to and held at the temperatures necessary to process into useful parts. Data for the polymer described in Example 8 from the rheometer is presented in Table 10. The melt viscosity in poise is shown for a sample held at 250° C. for one then heated from 250° C. to 371° C. at 4° C./min.

EXAMPLE 20

Preparation of Glass Coating

Solutions of the terminated polyamide acids according to the present invention were poured onto glass plates and spread to a uniform thickness using a doctor blade with a preset gap. After drying to a tack free form in a dust free atmosphere, the polymers were heated 1 hour each at 100°, 200° and either 316° or 350° C. to form a polyimide coating with high adhesion to the glass plate.

EXAMPLE 21

Preparation of Wire Coating

Steel and copper wires were dipped into the solutions of terminated polyamide acids and removed to form a polymer/ solvent coating on the wires. After drying to a tack free form in a dust free atmosphere, the polymers were heated 1 hour each at 100°, 200° and either 316° or 350° C. to form a tough, flexible, polyimide coating with high adhesion to the steel or copper wire.

I claim:

1. A polyimide copolymer prepared by reacting a mixture of 3,4'-oxydianiline (ODA) and 1,3-bis(3-aminophenoxy) benzene (APB) with 3,3',4,4'-biphenylcarboxylic dianhydride (BPDA), and terminating the reaction with an effective amount of a reactive endcapper.

2. A polyimide copolymer according to claim 1, wherein the mixture of ODA and APB has a ratio of ODA to APB within the range of about 95:5 to about 50:50.

3. A polyimide copolymer according to claim 2, wherein the ratio of ODA to APB is within the range of about 90:10 to about 70:30.

4. A polyimide copolymer according to claim 3, wherein the ratio of ODA to APB is about 85:15.

5. A polyimide copolymer according to claim 2, wherein the reactive endcapper is a member selected from the group consisting of 4-phenylethynyl phthalic anhydride (PEPA), 3-aminophenoxy-4'-phenylethynylbenzophenone (3-APEB), maleic anhydride (MA) and 5-norbornene-2,3-dicarboxylic anhydride (NA).

6. A polyimide copolymer according to claim 4, wherein the reactive endcapper is a member selected from the group consisting of 4-phenylethynyl phthalic anhydride (PEPA), 3-aminophenoxy-4'-phenylethynylbenzophenone (3-APEB), maleic anhydride (MA) and 5-norbornene-2,3-dicarboxylic anhydride (NA).

7. A polyimide copolymer according to claim 5, wherein the polyimide copolymer has a molecular weight within the range of about 1500 to about 15,000 g/mole.

8. A polyimide copolymer according to claim 7, wherein the molecular weight is within the range of about 2500 to about 10,000 g/mole.

9. A molding prepared from a polyimide copolymer according to claim 2.

10. A film prepared from a polyimide copolymer according to claim 2.

11. An adhesive prepared from a polyimide copolymer according to claim 2.

12. A graphite composite prepared from a polyimide copolymer according to claim 2.

13. A plate coating composition prepared from a polyimide copolymer according to claim 2.

14. A wire coating composition prepared from a polyimide copolymer according to claim 2.

* * * * *

UNITED STATES PATENT AND TRADEMARK OFFICE
CERTIFICATE OF CORRECTION

PATENT NO. : 5,644,022
DATED : Jul. 1, 1997
INVENTOR(S) : Brian J. Jensen

It is certified that error appears in the above-identified patent and that said Letters Patent is hereby corrected as shown below:

Column 2, line 66:

After "ODA/50% APB", delete "¹⁸95%" and insert ---~95%--- in lieu thereof.

Column 9, line 53:

After "Synthesis of LaRC™-80/", delete "2.0" and insert ---20--- in lieu thereof.

Column 14, line 53:

After "dilute solution", delete "(¹⁸5%" and insert ---(~5%--- in lieu thereof.

Signed and Sealed this

Twenty-ninth Day of May, 2001

Attest:

NICHOLAS P. GODICI

*Attesting Officer*    *Acting Director of the United States Patent and Trademark Office*